(12) United States Patent
Lobo et al.

(10) Patent No.: US 8,406,723 B1
(45) Date of Patent: Mar. 26, 2013

(54) RADIO FREQUENCY FILTER HAVING AN ACTIVE INDUCTOR

(75) Inventors: Ryan Lobo, Richardson, TX (US); Timothy M. Magnusen, Murphy, TX (US)

(73) Assignee: CSR Technology Inc., Sunnyvale, CA (US)

( * ) Notice: Subject to any disclaimer, the term of this patent is extended or adjusted under 35 U.S.C. 154(b) by 1086 days.

(21) Appl. No.: 12/366,458

(22) Filed: Feb. 5, 2009

(51) Int. Cl.
*H04B 1/16* (2006.01)
(52) U.S. Cl. .................. 455/307; 455/339; 327/552
(58) Field of Classification Search .............. 455/7, 296, 455/307, 310, 323, 324, 333, 334, 336, 338, 455/339; 327/552, 553
See application file for complete search history.

(56) References Cited

U.S. PATENT DOCUMENTS

| 7,289,784 B2* | 10/2007 | Nam | 455/339 |
|---|---|---|---|
| 2006/0154641 A1* | 7/2006 | Desclos | 455/333 |
| 2010/0240301 A1* | 9/2010 | Robert et al. | 455/7 |

* cited by examiner

*Primary Examiner* — Thanh Le
(74) *Attorney, Agent, or Firm* — Fulbright & Jaworski L.L.P.

(57) ABSTRACT

Systems and methods which provide DC current path circuitry, such as for providing a DC bias, in association with a filter circuit such that parasitic attributes of the DC current path circuitry combines with the filter component attributes are shown. According to embodiments, the parasitic attributes of the DC current path circuitry components are added into the associated filter circuit network design. A parasitic capacitance of the DC current path circuitry may, for example, be aggregated with a capacitor of the filter circuit to eliminate or mitigate the effect of the presence of the DC current path circuitry on the associated filter frequency response. Embodiments implement an active inductor configuration for providing a DC current path in association with a filter circuit. An active inductor of embodiments is provided using a transistor, appropriately biased to actively exhibit low impedance at DC and high impedance at RF frequencies.

33 Claims, 5 Drawing Sheets

RADIO FREQUENCY FILTER HAVING AN ACTIVE INDUCTOR

CROSS-REFERENCE TO RELATED APPLICATIONS

The present application is related to co-pending and commonly assigned U.S. patent application Ser. No. 12/271,607 entitled "Broadband Integrated Tuner," filed Nov. 14, 2008, and Ser. No. 11/486,706 entitled "Broadband Integrated Tuner," filed Jul. 14, 2006, the disclosures of which are incorporated herein by reference.

TECHNICAL FIELD

The invention relates generally to radio frequency circuitry and, more particularly, to radio frequency filters having an active inductor to facilitate desired frequency response.

BACKGROUND OF THE INVENTION

Various tuner circuits have been implemented in providing tuning with respect to radio frequency (RF) signals for a number of years. For example, single conversion tuners (tuners directly converting a transmitted RF signal to a baseband frequency) and multiple conversion tuners (tuners converting a transmitted RF signal to a baseband frequency in one or more stages, using an intermediate frequency (IF) at each stage) are in widespread use today. Such tuners are used in television sets and cable set top boxes to provide tuning to a desired television channel for viewing. Similarly, tuners are used in cable modems to provide tuning to a selected broadband data carrier channel. Examples of multiple conversion tuners implemented in a highly integrated circuit configuration are shown and described in the above referenced patent applications entitled "Broadband Integrated Tuner."

For example, it is not uncommon to utilize a dual conversion tuner, having a up-converter (mixer providing conversion of an RF input signal to a first intermediate frequency (IF)) and a down-converter (mixer providing conversion of the first IF to a second IF or a baseband signal), in a cable television set-top box to provide tuning with respect to a single cable television channel from a broadband cable signal including one hundred or more cable television channels. Representative prior art dual conversion tuner 100 is shown in FIG. 1, wherein the input signal ($F_{IN}$) is a RF signal which is converted to a particular desired frequency ($F_{OUT}$), e.g., baseband frequency, for further signal processing.

Tuner 100 comprises mixers 111 and 112, here an up-converter and down-converter respectively. The source signal, as imposed on carrier frequency $F_{IN}$, is injected into mixer 111 for up-conversion to a first IF, denoted here as $F_{IF1}$. Accordingly, mixer 111 is driven by frequency source 101, here a local oscillator (LO) providing LO frequency $F_{LO1}$. Similarly, the source signal, as imposed on carrier frequency $F_{IF1}$, is injected into mixer 112 for down-conversion to a second IF, denoted here as $F_{IF2}$. Accordingly, mixer 112 is driven by frequency source 102, here a LO providing LO frequency $F_{LO2}$. It should be appreciated that in this example of tuner 100 the baseband $F_{OUT}$, is $F_{IF2}$.

In operation of tuner 100, the signal input to mixer 111 ($F_{IN}$) is combined with the LO signal ($F_{LO1}$) to produce a frequency translated signal ($F_{IF1}$) corresponding to the sum ($F_{LO1}+F_{IN}$) and difference ($F_{LO1}-F_{IN}$) of the input signals. Likewise, the signal input to mixer 112 ($F_{IF1}$) is combined with the LO signal ($F_{LO2}$) to produce a frequency translated signals ($F_{IF2}$) corresponding to the sum ($F_{LO2}+F_{IF1}$) and difference ($F_{LO2}-F_{IF1}$) of the input signals. Filters are typically implemented to remove one of the mixer signals. For example, first IF filter 120 may be utilized to remove the sum component output from mixer 111, such that the first IF signal comprises the difference component ($F_{IF1}=F_{LO1}-F_{IN}$) and thus provides a subtractive mixer configuration. Similarly, a second IF filter (not shown) may be utilized to remove the sum component output from mixer 112, such that the second IF signal comprises the difference component ($F_{OUT}=F_{LO2}-F_{IF2}$) and thus provides a second subtractive mixer configuration.

It should be appreciated that the signals output from mixers 111 and 112 (i.e., $F_{IF1}$ and $F_{IF2}$) include all signals input into the mixer, and are not limited to a particular signal of interest. Moreover, signals appearing at an image frequency (e.g., $F_{LO2}+F_{IF2}$ is an image frequency for mixer 112 where mixer 112 is used in a subtractive mixer configuration) will be frequency translated into the output band of interest for a mixer (e.g., $F_{IF2}$ for mixer 112) if present at the input to the mixer, thus interfering with a source signal. Accordingly, in order to accommodate a broadband signal and provide a desired level of isolation with respect to a particular signal therein, various filters may be implemented with respect to a dual conversion tuner. For example, a common technique is to utilize the aforementioned first IF filter 120, disposed in the signal path between the up-converter (mixer 111) and the down-converter (mixer 112), in an attempt to pass substantially only a desired signal bandwidth to the second mixer. For example, first IF filter 120 may be utilized not only to filter the aforementioned sum component, but also to remove image frequencies, spurious signals, other signal channels, etc.

Accordingly, it would typically be desired that first IF filter 120 have a precise (low tolerance) center frequency and provides a high quality (Q) factor filter (providing sharp cutoff characteristics) having a very narrow bandwidth. The tolerance of such a first IF filter should typically be very low (the center frequency must be very close to a selected frequency) in order to avoid substantial attenuation of a desired signal associated with the sharp cutoffs of the pass band.

An exemplary filter configuration as may be implemented as first IF filter 120 in the prior art is shown in FIG. 2. Inductor $L_1$ and capacitors $C_1$ and $C_2$ of FIG. 2 provide an LC passive filter network having a frequency response as illustrated by the frequency response curve of FIG. 3, wherein the horizontal axis represents frequency and the vertical axis represents impedance. Specifically, the illustrated filter circuit 2 provides a center frequency of $$\frac{1}{\sqrt{L_1 C_1}}$$

at peak 301 and a zero at frequency $$\frac{1}{\sqrt{L_1(C_1+C_2)}}$$

at valley 302.

Mixer 111 of this example comprises a transconductance mixer, and therefore operates as a current source to first IF filter 120. Thus the impedance of first IF filter 120, as shown along the impedance (vertical) axis in the filter response curve of FIG. 3, is directly correlated to the frequency response output of the filter. Resistor R* of FIG. 2 represents the impedance associated with the non-ideal filter components $L_1$, $C_1$, and $C_2$, and thus represents the impedance of the illustrated filter circuitry. As can be seen by the frequency response curve of FIG. 3, the filter circuitry of FIG. 2 provides a generally acceptable filter configuration, wherein a center frequency may be precisely established and which exhibits a relatively high Q factor.

However, the circuitry of mixer 111 providing transconductance mixer operation typically requires a direct current (DC) bias. The filter circuit capacitors, $C_1$ and $C_2$, provide low frequency blocking or a zero, which essentially provides DC blocking between the input (IN) of first IF filter 120 and $V_{CC}$ in the example of FIG. 2. This DC blocking prevents the aforementioned DC bias. Accordingly, an inductor, such as radio frequency choke (RFC) shown in FIG. 2, is often utilized to provide a DC biasing path. Although it is desirable to have a very high inductance RFC, such a configuration is not always possible. For example, high inductance inductors require appreciable size, such as may require a larger than acceptable portion of an integrated circuit. Moreover, as with the non-ideal filter components discussed above, the RFC is itself non-ideal. Accordingly, capacitor $C_{PAR}$ is shown in parallel with RFC to represent the parasitic capacitance introduced by this DC biasing component.

The use of the foregoing DC biasing inductor alters the frequency response of first IF filter 120 shown in FIG. 2. In particular, an appreciable passband having a center frequency of $$\frac{1}{\sqrt{RFC(C_{PAR} + C_2)}}$$

at peak 303 is introduced by the DC biasing circuit. As can be appreciated by the frequency response curve of FIG. 3, peak 303 is disposed at a frequency relatively near the center frequency of the filter circuit, and is thus likely to allow unwanted signals such as image frequencies and spurious frequencies to interfere with a source signal of interest. The impedance ($1/C_{PAR}$) of the DC biasing circuit, and thus the frequency response output of the filter associated with the DC biasing circuit, can be quite significant (e.g., compare peak 301 and 303). Moreover, the impedance of the DC biasing circuit is in parallel with the impedance of the filter circuit, thereby reducing the impedance of the LC filter circuit. Accordingly, the performance (e.g., image rejection, bandwidth, etc.) of first IF filter 120 is adversely affected by the DC biasing circuit.

BRIEF SUMMARY OF THE INVENTION

The present invention is directed to systems and methods which provide DC current path circuitry (e.g., for providing DC biasing) in association with a filter circuit such that parasitic attributes (e.g., parasitic capacitance) of the DC current path circuitry combines with the filter component attributes. According to embodiments, the parasitic attributes of the DC current path circuitry components are added into the associated filter circuit network design. Accordingly, there are in effect no parasitic elements that limit the filter circuit such that embodiments provide DC current path circuitry without impairing the performance of the associated filter circuit.

For example, embodiments of the invention dispose DC current path circuitry in series with a resonant circuit of an associated filter circuit. Such a series configuration according to embodiments provides absorption of parasitic attributes of the DC current path circuitry into the filter circuit. Additionally or alternatively, embodiments of the invention dispose DC current path circuitry in parallel with a component of an associated filter circuit. It is this parallel filter circuit component which absorbs parasitic attributes of the DC current path circuitry according to embodiments of the invention. A parasitic capacitance of the DC current path circuitry may, for example, be aggregated with a capacitor of the filter circuit disposed in parallel thereto to thereby eliminate or mitigate the effect of the presence of the DC current path circuitry on the associated filter frequency response.

Embodiments of the invention implement an active inductor configuration for providing a DC current path in association with a filter circuit. An active inductor of embodiments is provided using a transistor, appropriately biased to actively exhibit low impedance (e.g., approaching a short circuit) at DC or very low frequencies and high impedance (e.g., approaching an open circuit) at RF frequencies or other frequencies associated with a band of interest passband, image frequencies, spurious signal frequencies, etc.). A field effect transistor (FET) is utilized as an active inductor according to embodiments of the invention to provide the foregoing active operation.

DC current path circuitry provided according to embodiments of the invention provides a DC current path without parasitic attributes of the DC current path circuitry components adversely affecting the transfer function of an associated filter circuit. Moreover, active inductor DC current path circuitry of embodiments utilizes reduced area, as compared to high impedance inductor configurations, in providing low impedance operation at low frequencies and high impedance operation at high frequencies.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
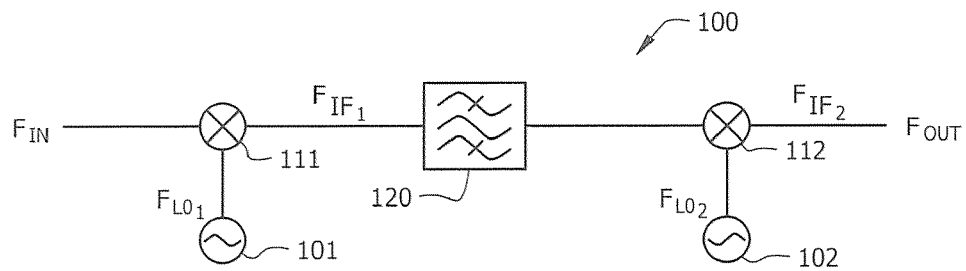
FIG. 1 shows block diagram of a prior art dual conversion tuner.
Figure 2:
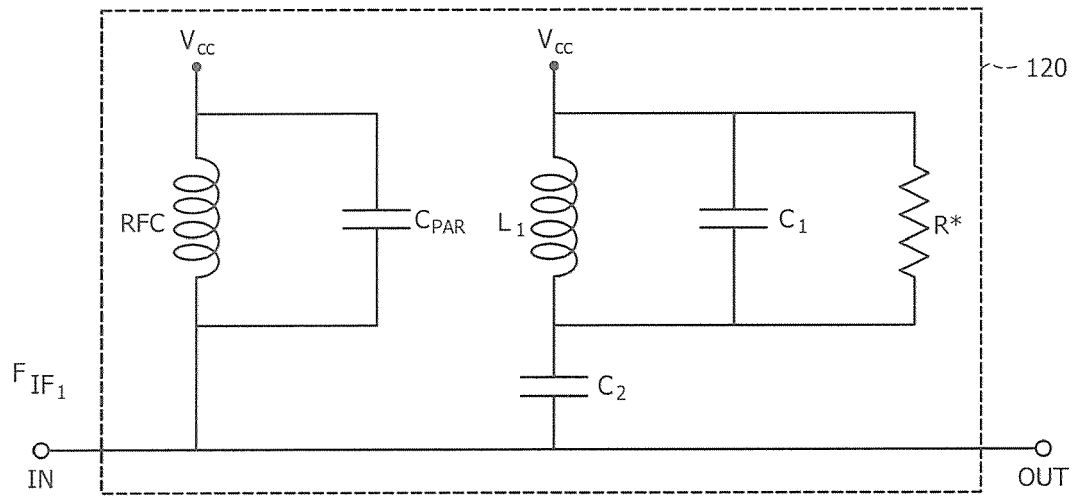
FIG. 2 shows an exemplary circuit configuration of the intermediate frequency filter circuitry of the prior art dual conversion tuner of FIG. 1.
Figure 3:
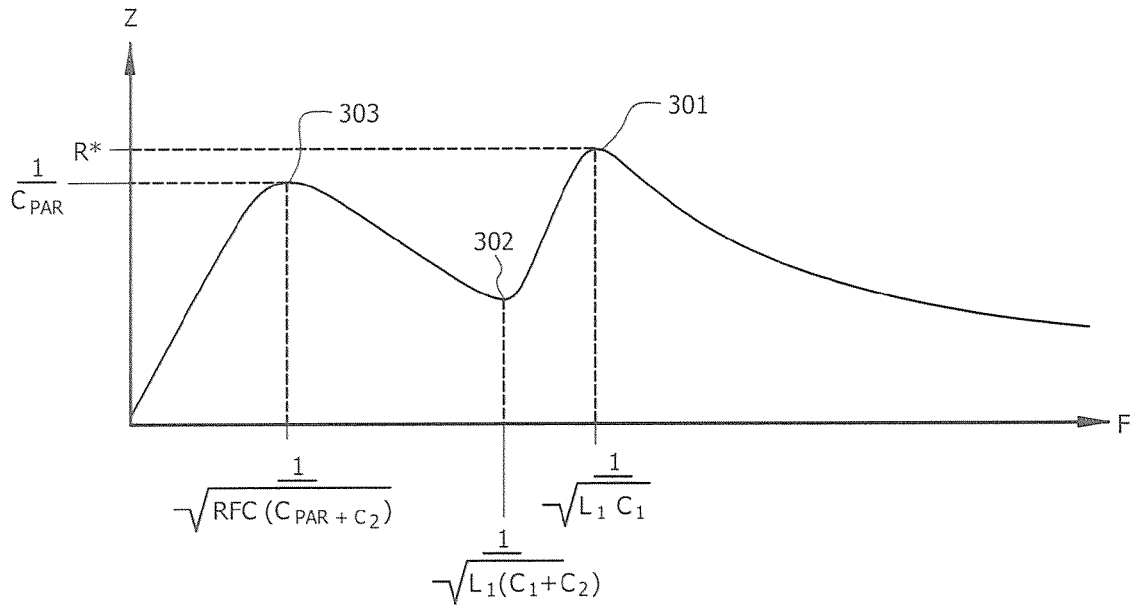
FIG. 3 shows a frequency response curve of intermediate frequency filter circuitry of FIG. 2.
Figure 4:
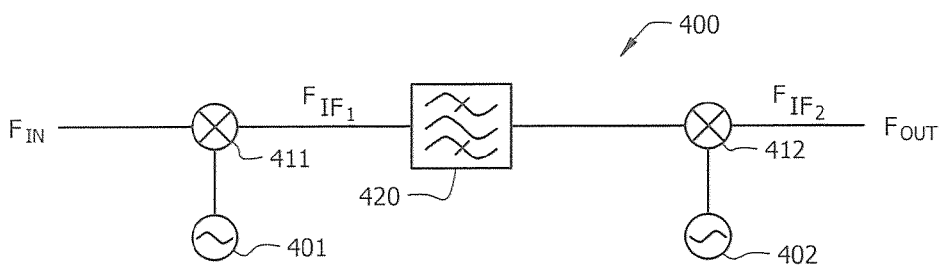
FIG. 4 shows block diagram of a dual conversion tuner adapted according to an embodiment of the present invention.

Dual conversion tuner 400 adapted according to an embodiment of the present invention is shown in FIG. 4. In the illustrated embodiment, the signal ($F_{IN}$) input into tuner 400 is a RF signal which is converted to a particular desired frequency ($F_{OUT}$), e.g., baseband frequency, for further signal processing. It should be appreciated that tuner 400 may be coupled to various source signals, such as that provided from a television cable plant or an antenna (both not shown), and may provide a frequency translated signal to various signal processing circuitry, such as that of a television set, a computer, a radio, a telephone, etc.

Tuner 400 of the illustrated embodiment comprises mixers 411 and 412, such as may comprise an up-converter and down-converter respectively. In operation according to embodiments, the source signal, as imposed on carrier frequency $F_{IN}$, is injected into mixer 411 for up-conversion to a first IF, denoted here as $F_{IF1}$. Accordingly, mixer 411 is driven by frequency source 401, such as may comprise a LO providing LO frequency $F_{LO1}$. Similarly, the source signal, as imposed on carrier frequency $F_{IF1}$, is injected into mixer 412 for down-conversion to a second IF, denoted here as $F_{IF2}$. Accordingly, mixer 412 is driven by frequency source 402, such as may comprise a LO providing LO frequency $F_{LO2}$. It should be appreciated that in this example of tuner 400 the baseband signal, $F_{OUT}$, is $F_{IF2}$.

As previously discussed with respect to tuner 100, the signal input to a mixer is combined with the LO signal to produce a frequency translated signal corresponding to the sum and difference of the input signals. First IF filter 420 of embodiments provides for remove one of the mixer signals, to thereby provide either a subtractive or additive mixer output configuration. For example, first IF filter 420 may be utilized to remove the sum component output from mixer 411, such that the first IF signal comprises the difference component ($F_{IF1}=F_{LO1}-F_{IN}$) and thus provides a subtractive mixer configuration.

The signals output from mixers 411 and 412 (i.e., $F_{IF1}$ and $F_{IF2}$) include substantially all signals input into the mixer (i.e., all signals within the frequency response of the mixer), albeit frequency translated, and are not limited to a particular signal of interest. Moreover, signals appearing at an image frequency will be frequency translated into the output band of interest for a mixer if present at the input to the mixer, thus interfering with a source signal. Accordingly, in order to accommodate a broadband signal and provide a desired level of isolation with respect to a particular signal therein, first IF filter 420 is adapted to pass a relatively narrow band which includes the source signal of interest. Accordingly, first IF filter 420 of embodiments is not only utilized to filter the aforementioned sum component, but also to remove image frequencies, spurious signals, other signal channels, etc.

Figure 5:
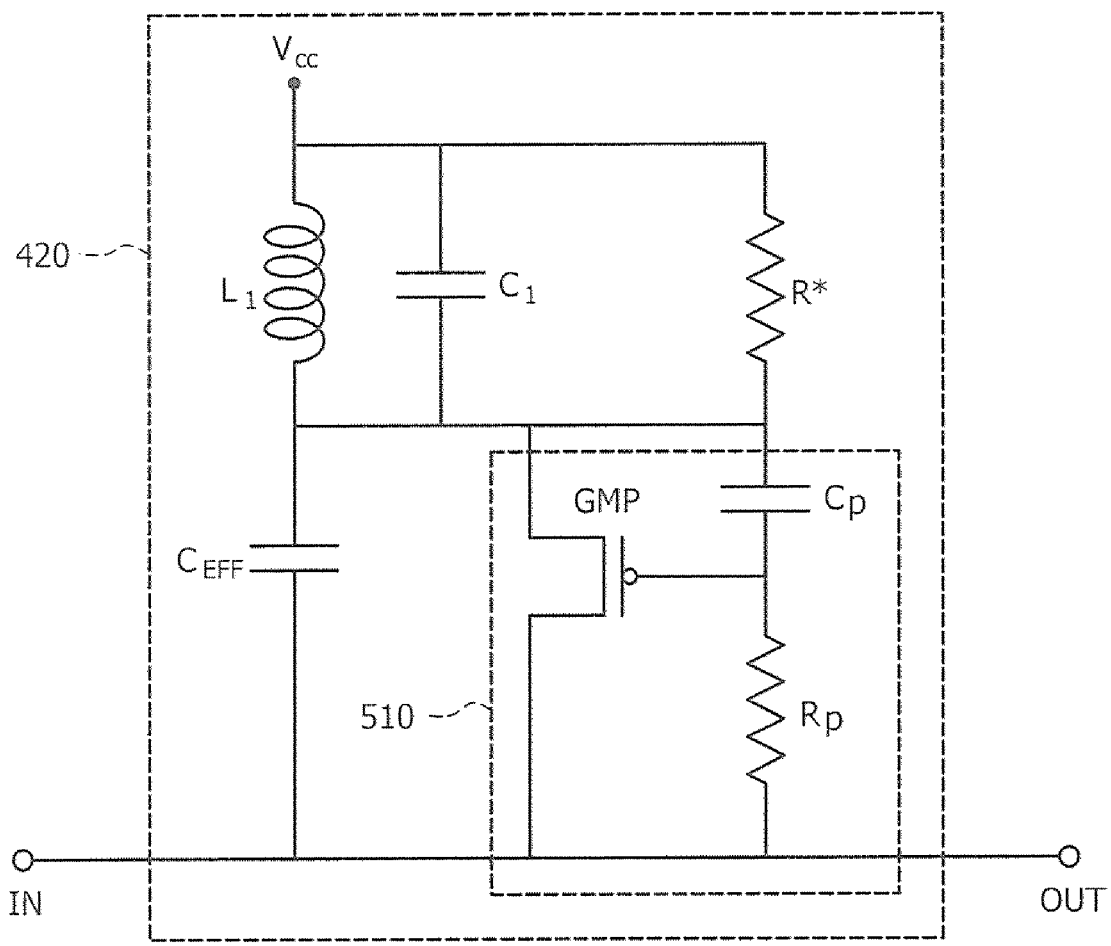
FIG. 5 shows a circuit configuration of the intermediate frequency filter circuitry of the dual conversion an embodiment of the intermediate frequency filter circuitry of the dual conversion circuit of FIG. 4.

A filter configuration of an exemplary embodiment, as may be implemented as first IF filter 420 of FIG. 4, is shown in FIG. 5. Inductor $L_1$ and capacitors $C_1$ and $C_{EFF}$ of FIG. 5 provide an LC passive filter network, wherein inductor $L_1$ and capacitor $C_1$ provide a resonant circuit and inductor $L_1$ and capacitors $C_1$ and $C_{EFF}$ provide a zero circuit. Resistor R* of FIG. 5 represents the impedance associated with the non-ideal filter components $L_1$, $C_1$, and $C_{EFF}$, and thus represents the impedance of the illustrated filter circuitry. The values of inductor $L_1$ and capacitor $C_1$ are preferably selected to provide a frequency response peak at or near a center of a selected passband. Similarly, the values of inductor $L_1$, capacitor $C_1$, and capacitor $C_{EFF}$ are selected to provide a null or zero at or near the image frequency of mixer 412. Of course, other design parameters may be utilized according to embodiments of the invention, such as to select the values of inductor $L_1$, capacitor $C_1$, and capacitor $C_{EFF}$ to provide a null or zero at or near spurious product frequencies other than a mixer image frequency.

Figure 6:
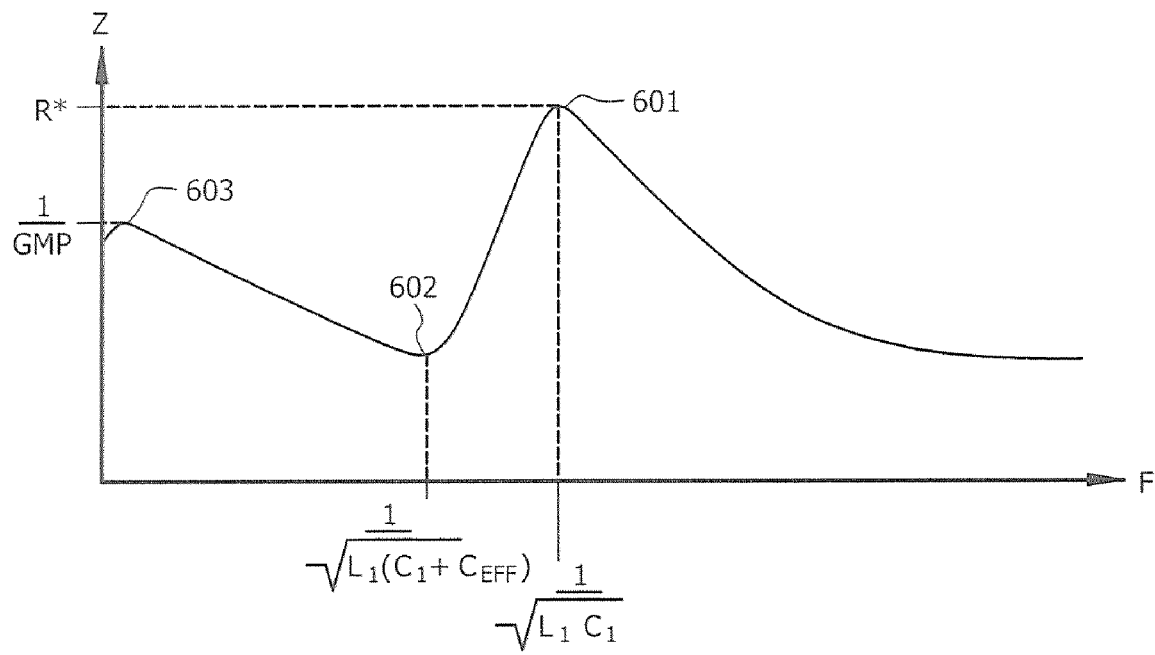
FIG. 6 shows a frequency response curve of intermediate frequency filter circuitry of FIG. 5 in operation according to embodiments of the invention.

The frequency response of the illustrated embodiment of first IF filter 420 is shown in FIG. 6, wherein the horizontal axis represents frequency and the vertical axis represents impedance. As can be seen in FIG. 6, the resonant circuit provided by inductor $L_1$ and capacitor $C_1$ has a center frequency of $$\frac{1}{\sqrt{L_1 C_1}}$$

at peak 601 associated therewith and the zero circuit provided by inductor $L_1$ and capacitors $C_1$ and $C_{EFF}$ has a zero at frequency $$\frac{1}{\sqrt{L_1(C_1 + C_{EFF})}}$$

at valley 602 associated therewith. Accordingly, first IF filter 420 of the illustrated embodiment provides a precise (low tolerance) center frequency and a high Q factor filter (providing sharp cutoff characteristics) having a very narrow bandwidth.

Mixer 411 of embodiments comprises a transconductance mixer, and therefore operates as a current source to first IF filter 420. Thus the impedance of first IF filter 420, as shown along the impedance (vertical) axis in the filter response curve of FIG. 6, is directly correlated to the frequency response output of the filter.

The circuitry of mixer 411 providing transconductance mixer operation utilizes a direct current (DC) bias. However, the filter circuit capacitors, $C_1$ and $C_{EFF}$, provide low frequency blocking or a zero, which essentially provides DC blocking between the input (IN) of first IF filter 420 and $V_{CC}$ in the embodiment of FIG. 5. This DC blocking prevents the aforementioned DC bias. Accordingly, embodiments of the invention implement DC current path circuitry in association with filter circuitry. Such DC current path circuitry is preferably adapted so that parasitic attributes of the DC current path circuitry, such as parasitic capacitance, combines with the filter component attributes in order that the performance of the associated filter circuit is not impaired.

The embodiment illustrated in FIG. 5, for example, includes DC current path circuitry 510 disposed in series with the resonant circuit formed from inductor $L_1$ and capacitor $C_1$ and in parallel with capacitor $C_{EFF}$ of the zero circuit. Such a configuration provides absorption of parasitic attributes of the DC current path circuitry into the filter circuit. For example, the parallel filter circuit component, $C_{EFF}$, absorbs parasitic attributes of DC current path circuitry 510 according to embodiments of the invention.

Figure 7:
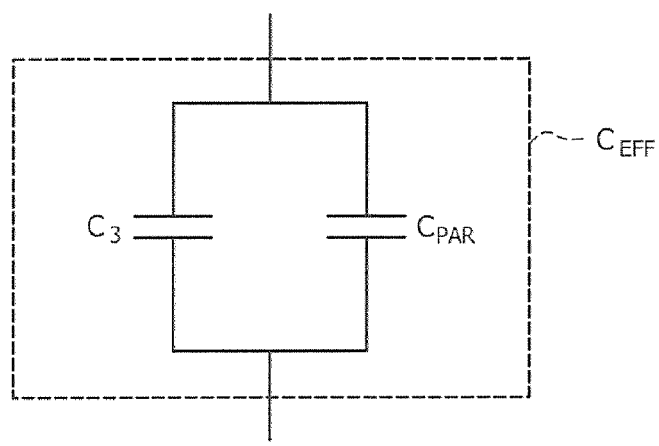
FIG. 7 shows multiple capacitive components forming capacitor $C_{EFF}$ of FIG. 5 according to embodiments of the invention.

A parasitic capacitance of DC current path circuitry 510 is, for example, aggregated with a capacitance of capacitor $C_{EFF}$ to thereby eliminate or mitigate the effect of the presence of DC current path circuitry 510 on the associated filter frequency response. For example, capacitor $C_{EFF}$ of embodiments comprises multiple capacitive components as represented in FIG. 7. Specifically, in the embodiment of FIG. 7, capacitor $C_{EFF}$ is comprised of two parallel capacitive components, capacitors $C_3$ and $C_{PAR}$. Capacitor $C_{PAR}$ represents the parasitic capacitance of DC current path circuitry 510, which in a typical implementation may be expected to be on the order of 100 femtoFarads or less. Capacitor $C_3$ comprises a capacitor disposed in first IF filter 420 to provide the aforementioned zero circuit. Accordingly, capacitor $C_3$ of embodiments corresponds to capacitor $C_2$ discussed above, except that the value of capacitor $C_3$ is selected such that the effective capacitor, $C_{EFF}$, absorbs the value of the parasitic capacitance, $C_{PAR}$, to provide a desired frequency response for first IF filter 420. That is, $C_{EFF}=C_2=C_3+C_{PAR}$ according to embodiments of the invention.

DC current path circuitry 510 of embodiments of the invention comprises an active inductor configuration. For example, transistor GMP of FIG. 5 and its bias circuitry capacitor $C_P$ and $R_P$ provides an active inductor of the illustrated embodiment. The active inductor configuration of embodiments exhibit low impedance (e.g., approaching a short circuit) at DC or very low frequencies and high impedance (e.g., approaching an open circuit) at RF frequencies or other frequencies associated with a band of interest (e.g., passband, image frequencies, spurious signal frequencies, etc.).

The illustrated embodiment comprises a p-channel field effect transistor (pFET) having resistor $R_P$ coupling the gate and drain and capacitor $C_P$ coupling the gate and source. Resistor $R_P$ may comprise a resistor on the order of $R_P \gg 10$ (R*), for example. Capacitor $C_P$ may comprise a capacitor on the order of $C_P \gg 10(C_{PAR})$, for example. Accordingly, at DC resistor $R_P$ operates short transistor GMP on, effectively resulting in transistor GMP operating as a diode to conduct DC current to $V_{CC}$ through inductor $L_I$. At high frequencies, capacitor $C_P$ (which is preferably a very small body compared to resistor $R_P$) operates to turn transistor GMP off, wherein substantially all the current then passes through capacitor $C_{EFF}$ of the filter circuit. Accordingly, transistor GMP, resistor $R_P$, and capacitor $C_P$ of the illustrated embodiment provides an active inductor circuit configuration. That is, transistor GMP, resistor $R_P$, and capacitor $C_P$ of the illustrated embodiment actively operate to emulate the operation of an inductor, and thus are referred to herein as an active inductor.

Figure 8:
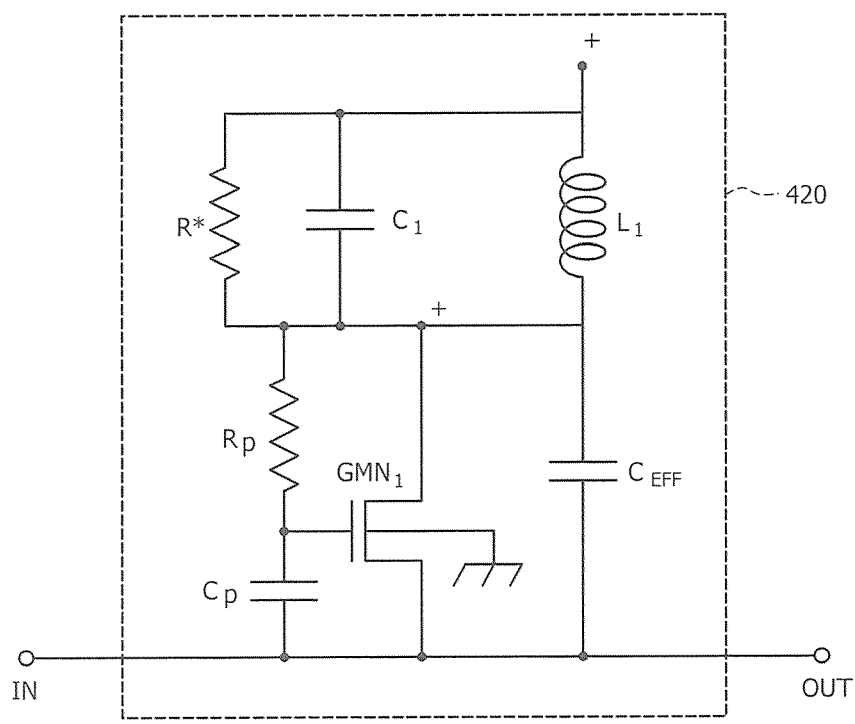
FIG. 8 shows an alternative circuit configuration of the intermediate frequency filter circuitry of the dual conversion an embodiment of the intermediate frequency filter circuitry of the dual conversion circuit of FIG. 4.
Figure 9:
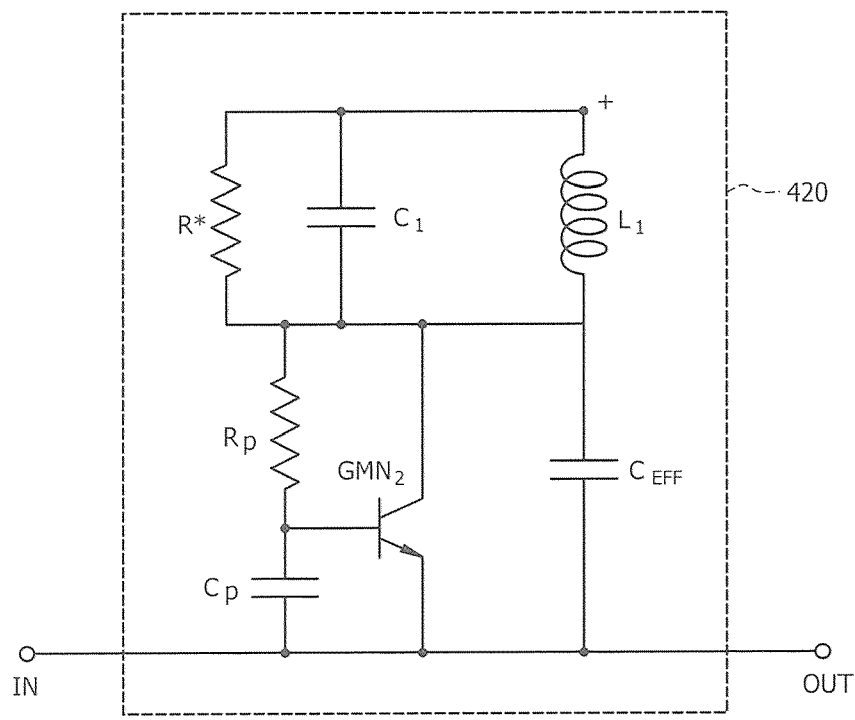
FIG. 9 shows another alternative circuit configuration of the intermediate frequency filter circuitry of the dual conversion an embodiment of the intermediate frequency filter circuitry of the dual conversion circuit of FIG. 4.

Of course, circuit configurations other than that of the illustrated embodiment may be utilized as a active inductor according to embodiments of the invention. For example, a n-channel FET (nFET) may be utilized in providing an active inductor (actively operate to emulate the operation of an inductor), as shown in the embodiment of FIG. 8. Additionally or alternatively, a bipolar transistor may be utilized in providing an active inductor, as shown in the embodiment of FIG. 9.

An active inductor is preferable according to embodiments of the invention due, in part, to embodiments of such an active inductor providing a DC current path similar to that of a very high inductance inductor without the physical size of a high inductance inductor. This can be particularly important in an integrated circuit tuner configuration, such as those shown and described in the above referenced patent applications entitled "Broadband Integrated Tuner."

As can be seen in the frequency response curve of FIG. 6, the use of the foregoing DC current path circuit does not appreciable alter the frequency response of first IF filter 420. In particular, although a DC current path circuit pole at peak 603, this peak is associated with frequencies which are considerably lower than that of the filter circuit passband and effectively do not alter the frequency response of the filter. Moreover, the magnitude of peak 603 relative to peak 601 of the filter circuit passband is no small as to effectively provide an unaltered filter frequency response.

As can be appreciated from the foregoing, DC current path circuitry of embodiments provides a DC current path without parasitic attributes of the DC current path circuitry components adversely affecting the transfer function of an associated filter circuit. Moreover, the active inductor circuitry of embodiments utilizes reduced area, as compared to high impedance inductor configurations, in providing low impedance operation at low frequencies and high impedance operation at high frequencies.

It should be appreciated that, although embodiments have been described herein with reference to a dual conversion tuner circuit, the concepts of the present invention are applicable to many circuit configurations. For example, embodiments of the invention may be utilized with respect to multiple conversion tuners utilizing tuners in excess of 2. Of course, DC current path circuitry of embodiments of the present invention may be utilized in filter circuits for any number of applications, and thus are not limited to use with multiple conversion tuners or even tuners.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
    a radio frequency (RF) filter having a filter network circuit and a direct current (DC) path circuit, said filter network circuit and said DC path circuit configured to aggregate a parasitic attribute of said DC path circuit with an attribute of a component of said filter network circuit to provide a desired frequency response by said filter network circuit.

2. The system of claim 1, wherein said parasitic attribute comprises a parasitic capacitance, and wherein said filter network circuit component comprises a capacitor.

3. The system of claim 1, wherein said filter circuit component comprises a component of said filter circuit providing a zero of said RF filter.

4. The system of claim 1, wherein said DC path circuit is disposed electrically in parallel with said filter network circuit component.

5. The system of claim 1, wherein said DC path circuit is disposed electrically in serial with a resonant circuit portion of said filter network circuit.

6. The system of claim 5, wherein said DC path circuit is disposed electrically in parallel with a zero circuit component of said filter network circuit.

7. The system of claim 1, wherein said DC path circuit comprises a DC bias current circuit path.

8. The system of claim 1, wherein said DC path circuit comprises an active inductor circuit, said active inductor circuit providing operation emulating operation of an inductor.

9. The system of claim 8, wherein said operation emulating the operation of an inductor conducts DC and blocks RF frequency alternating current (AC).

10. The system of claim 8, wherein said active inductor comprises a field effect transistor (FET) biased to provide said operation emulating the operation of an inductor.

11. The system of claim 10, wherein said active inductor comprises a gate to drain resistor and a gate to source capacitor providing said bias to provide said operation emulating the operation of an inductor.

12. The system of claim 10, wherein said FET comprises a p-channel FET (pFET).

13. A system comprising:
a filter network circuit; and
an active inductor circuit coupled to the filter network circuit, said active inductor circuit adapted to provide a direct current (DC) bias path in association with said filter network circuit.

14. The system of claim 13, wherein said active inductor circuit is adapted to emulate operation of an inductor by conducting DC current and blocking radio frequency (RF) alternating current.

15. The system of claim 13, wherein said active inductor comprises a field effect transistor (FET).

16. The system of claim 15, wherein said FET is biased to conduct DC and block alternating current (AC).

17. The system of claim 16, wherein said active inductor comprises a gate to drain resistor and a gate to source capacitor providing said bias to conduct DC current and block AC.

18. The system of claim 15, wherein said FET comprises a p-channel FET (pFET).

19. The system of claim 13, wherein said filter network circuit and said active inductor circuit are configured to aggregate a parasitic attribute of said active inductor circuit with an attribute of a component of said filter network circuit to provide a desired frequency response by said filter network circuit.

20. The system of claim 19, wherein said parasitic attribute comprises a parasitic capacitance, and wherein said filter network circuit component comprises a capacitor.

21. The system of claim 19, wherein said filter circuit component comprises a component of said filter circuit providing a zero in a frequency response of said filter network circuit.

22. The system of claim 19, wherein said active inductor circuit is disposed electrically in parallel with said filter network circuit component.

23. The system of claim 19, wherein said active inductor circuit is disposed electrically in serial with a resonant circuit portion of said filter network circuit.

24. A method comprising:
providing a filter network circuit;
providing a direct current (DC) path circuit in association with said filter network circuit; and
configuring said filter network circuit to absorb a parasitic attribute of said DC path circuit with an attribute of a component of said filter network circuit to provide a desired frequency response by said filter network circuit.

25. The method of claim 24, further comprising:
determining a value of said filter network circuit component so as to provide a desired aggregated value when said filter network circuit and said DC path circuit are coupled.

26. The method of claim 24, further comprising:
disposing said DC path circuit to be electrically in parallel with said filter network circuit component.

27. The method of claim 24, further comprising:
disposing said DC path circuit electrically in serial with a resonant circuit portion of said filter network circuit.

28. The method of claim 24, wherein said DC path circuit comprises a DC bias current path.

29. The method of claim 24, wherein said DC path circuit comprises an active inductor circuit.

30. The method of claim 29, further comprising:
biasing said active inductor to conduct DC and block alternating current (AC).

31. The method of claim 29, wherein said DC path circuit comprises a field effect transistor (FET).

32. The method of claim 31, wherein said providing said DC path circuit comprises:
providing a gate to drain resistor and a gate to source capacitor providing a bias to conduct DC current and block AC.

33. The method of claim 31, wherein said FET comprises a p-channel FET (pFET).

* * * * *